G. T. ROWTON.
FLUID PRESSURE AIR BRAKE MEANS.
APPLICATION FILED JULY 29, 1909.
947,086.
Patented Jan. 18, 1910.
2 SHEETS—SHEET 1.
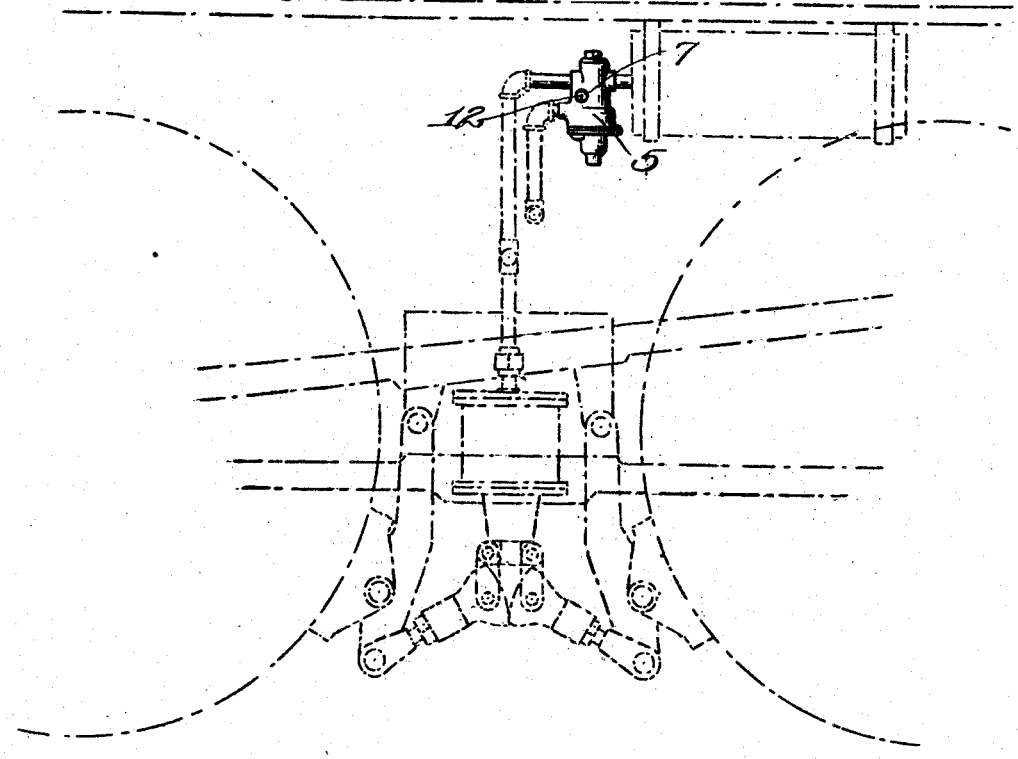
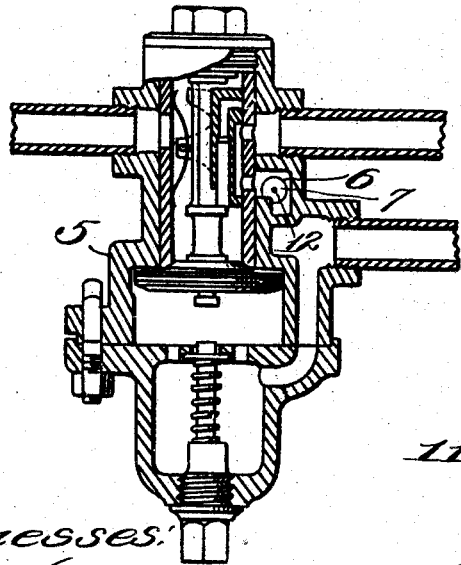
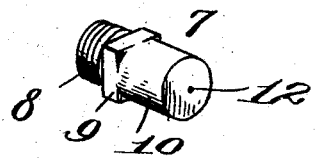
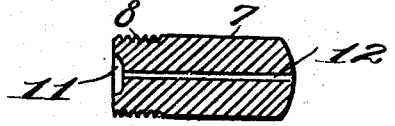
Witnesses:
Inventor
George T. Rowton
By
James L. Norris.
Atty.

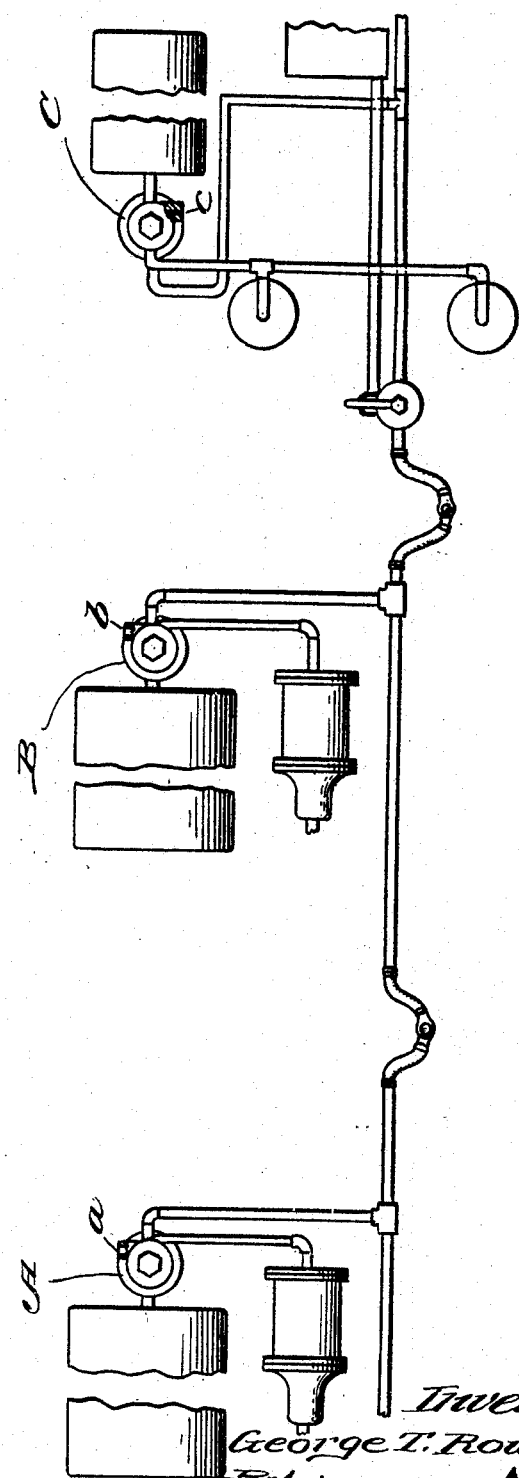

though it is preferred that the engine brake
UNITED STATES PATENT OFFICE.

GEORGE T. ROWTON, OF JACKSON, MISSISSIPPI.

FLUID-PRESSURE AIR-BRAKE MEANS.

947,086.　　　　Specification of Letters Patent.　　Patented Jan. 18, 1910.

Application filed July 29, 1909. Serial No. 510,219.

*To all whom it may concern:*

Be it known that I, GEORGE T. ROWTON, a citizen of the United States, residing at Jackson, in the county of Hinds and State of Mississipi, have invented new and useful Improvements in Fluid-Pressure Air-Brake Means, of which the following is a specification.

This invention relates to fluid pressure railway brakes, and more especially to such brakes which embody means for varying the pressure in the train pipe to apply and release the brakes and particularly to what is commonly known as the "tripple valve".

The principal object of the invention is to retard the release of brakes at the head end of trains and particularly in relation to the engine drivers to prevent accidental breaking apart of trains and obviate the jarring and jerking motion frequently experienced by the traveling public in trains involving the usual brake mechanism of the fluid pressure type by maintaining the train solid through a gradual release of the brakes rearwardly toward the front end of the train.

The invention involves such a simplified structure that triple valves may be readily provided therewith without in the least disorganizing said valves or in any manner rearranging the usual fluid pressure brake devices now ordinarily used and applied to locomotives or engines and cars.

In the accompanying drawing only so much of a fluid pressure railway brake system has been shown as to render the application of the features of improvement intelligible, but it will be understood that the usual elements of such brake mechanism will be used as are commonly employed at the present time, and the invention is shown applied to the controlling or triple valve of the engine.

In the drawings: Figure 1 shows a side elevation of a controlling or triple valve connected up to the reservoir and brake cylinder of the engine driver brakes, all of the parts except the valve being illustrated in dotted lines. Fig. 2 shows a sectional view of a controlling or triple valve of usual form with the invention applied thereto. Figs. 3 and 4 respectively represent a perspective view and longitudinal section of a choke plug embodying the essential features of the invention and applied to the exhaust opening of the triple valve. Fig. 5 is a diagrammatic view of a portion of a fluid pressure brake system embodying the usual triple valves, one of the latter having the features of the invention applied thereto.

The numeral 5 designates the usual form or standard make of triple valve embodying the structure and elements ordinarily found in devices of this class and which it is unnecessary to describe in detail except the exhaust outlet or port 6 which is affected by the essential features of the invention. These valves as applied to locomotives or engines and cars have exhaust outlets or ports of uniform dimensions throughout the whole series of the valves included in the system comprised in a train fluid pressure brake and under the control of the engineer. The outlet or exhaust port 6 at the head of the train or on an engine in accordance with the features of this invention is reduced by inserting a choke plug 7 therein as shown in detail by Figs. 3 and 4. The choke plug has a screw-threaded extremity 8 which is fitted in the wall of the exhaust outlet or port 6, a shoulder 9 which abuts against said wall and also serves as a wrench engaging means for applying and removing the plug, and an outwardly projecting nipple extremity 10. The inner end of the plug 7 at the center is formed with a cavity 11 and extending therefrom fully through the plug is a bore 12 of reduced diameter. The outer nipple extremity 10 of the plug 7 is fully exposed at the exterior of the valve 5, and the plug may be readily applied to the present form of triple valve by screw-threading the wall of the opening or exhaust port 6 to receive the threads on the inner extremity 8 of the said plug. From the foregoing it will be seen that the cost of equipping an engine brake mechanism with the invention is reduced to a minimum, and though it is preferred that the engine brake mechanism in many instances be solely provided with the exhaust retarding means or coke plug, it will be understood that the cars immediately following an engine may likewise have their fluid pressure brake triple valves similarly provided with the exhaust reducing means or the exhaust thereof be retarded proportionately. When cars are equipped with the features of the invention as just noted, the bores of the choke plugs used in the triple valves of the cars will be of slightly greater diameter than that used on the engine valve and may decrease proportionately rearwardly toward the last of the cars so equipped.

The application of the plug to the engine valve as hereinbefore explained forces an engineer to release easily at all times in view of the fact that the cars in rear of the engine will have been fully released prior to the release of the engine driver brake, the reduced bore of the plug 7 of the triple valve of the engine driver brake causing the air to exhaust very slowly and the train to be held solid, and avoiding rough handling of air in making station stops and rendering such stops scarcely perceptible to anyone on the train. Another advantageous feature is that pulling out of draw heads will be avoided and racking and disadvantageous strains prevented from being imposed on the cars. The choke plug is so adjusted that when the valve handle is disposed in released position all the brakes behind the engine release first or just prior to the time the stop is made and the driver brake on the engine cannot release until several seconds after the stop is made.

It is proposed to apply the features of the invention on engines used both for passenger and freight service, and it is also intended to proportion the choke plugs relatively to the valves on which they are used. The use of the choke plug as hereinbefore described for reducing the exhaust port of one of the triple valves of the fluid pressure brake system of a train will be found to be a very simple means of practically embodying the invention in such system, particularly after the preliminary application of the triple valves or their initial manufacture. The invention, however, is not confined to the use of this plug, as it broadly contemplates the reduction of the dimension or diameter of the exhaust port of one triple valve forming part of the complement of a fluid pressure brake system of a train as particularly illustrated by Fig. 5, and wherein the valves A and B, for instance, may be applied to cars or coaches and the valve C to an engine, the latter having an exhaust port c of materially less diameter or dimension than the exhaust ports a and b of the respective valves A and B. This particular organization is to demonstrate that the exhaust port of the one triple valve used with a plurality of triple valves in a fluid pressure brake system may be originally formed of less diameter than the exhaust ports of the remaining valves. It is also possible that in some applications of a brake system the valve with the reduced exhaust port may be desirable for use other than at the head of the train and such location of the valve with the reduced port may be adopted, though it is obvious that its situation at the head of the train is preferred.

What is claimed is:

1. A fluid pressure brake system including in its complement a plurality of triple valves having exhaust ports, the exhaust port of one of the valves being of less dimension than the exhaust ports of the remaining valves.

2. A fluid pressure brake system including in its complement a plurality of triple valves performing their usual function and provided with exhausting means, the exhausting means of one of the valves being reduced and operating slower than the exhausting means of the remaining valves.

3. A fluid pressure brake system including in the complement thereof a plurality of exhaust means, one of the exhaust means having a smaller outlet to the atmosphere and a slower exhausting operation than the remaining exhaust means.

4. A fluid pressure brake system including in its complement a plurality of exhaust means, a portion of the said exhaust means having external outlet means of less dimension and slower exhausting operation than the remaining portion of said exhaust means.

5. A fluid pressure brake system including in its complement a plurality of triple valves, the triple valve at the forward extremity of the system having an external outlet means of less dimension and slower exhaust operation than the remaining valves.

6. A fluid pressure brake system including in its complement a plurality of triple valves having exhaust outlets, the one outlet being of normally less dimension than the remaining outlets and operating to have a slower exhaust irrespective of the variation in train line pressure.

7. A fluid pressure brake system including in its complement a plurality of exhaust means, the one exhaust means operating slower than the remaining means irrespective of variation in train line pressure.

8. A fluid pressure brake system including in its complement a plurality of triple valves having exhaust ports, and a choke plug with a reduced bore therethrough inserted in the port of one of the valves to retard the exhausting operation of the latter.

In testimony whereof I have hereunto set my hand in presence of two subscribing witnesses.

GEORGE T. ROWTON.

Witnesses:
  CHAS. S. HYER,
  JAMES L. NORRIS, Jr.